(12) United States Patent
Murata et al.

(10) Patent No.: US 9,754,700 B2
(45) Date of Patent: Sep. 5, 2017

(54) POWER CABLE POLYMER JOINT

(71) Applicant: Hitachi Metals, Ltd., Tokyo (JP)

(72) Inventors: Wataru Murata, Hitachi (JP); Yukinori Aishima, Ishioka (JP)

(73) Assignee: HITACHI METALS, LTD., Tokyo (JP)

( * ) Notice: Subject to any disclaimer, the term of this patent is extended or adjusted under 35 U.S.C. 154(b) by 3 days.

(21) Appl. No.: 14/965,598

(22) Filed: Dec. 10, 2015

(65) Prior Publication Data

US 2016/0172072 A1    Jun. 16, 2016

(30) Foreign Application Priority Data

Dec. 12, 2014 (JP) ................. 2014-251555

(51) Int. Cl.
*H02G 15/00* (2006.01)
*H01B 3/28* (2006.01)
*H02G 15/064* (2006.01)
*H02G 15/08* (2006.01)

(52) U.S. Cl.
CPC ............. *H01B 3/28* (2013.01); *H02G 15/064* (2013.01); *H02G 15/08* (2013.01)

(58) Field of Classification Search
CPC ...... H01R 11/11; H01R 4/0123; H01R 15/06; H02G 15/043
USPC ............... 174/74, 77 R, 78, 84 R, 88 R, 90
See application file for complete search history.

(56) References Cited

U.S. PATENT DOCUMENTS 4,383,131 A * 5/1983 Clabburn ............... H02G 15/10
156/49

| | | | | |
|---|---|---|---|---|
| 4,822,952 A * | 4/1989 | Katz | ................... | H02G 15/064 |
| | | | | 156/49 |
| 5,070,597 A * | 12/1991 | Holt | ..................... | F16L 5/02 |
| | | | | 138/103 |
| 5,365,020 A * | 11/1994 | Vallauri | ................ | H01R 4/70 |
| | | | | 174/73.1 |
| 5,408,047 A * | 4/1995 | Wentzel | ............... | H02G 15/103 |
| | | | | 156/49 |
| 9,178,289 B2 * | 11/2015 | Seraj | ..................... | H01R 4/70 |
| 2004/0099434 A1 * | 5/2004 | Balconi | ............... | H02G 15/103 |
| | | | | 174/88 R |

(Continued)

FOREIGN PATENT DOCUMENTS

| EP | 0 683 555 A1 | 11/1995 | | |
|---|---|---|---|---|
| GB | 1180713 A | 2/1970 | | |
| IT | EP 0683555 A1 * | 5/1995 | ........... | H02G 15/068 |

(Continued)

OTHER PUBLICATIONS

Extended European Search Report dated Mar. 3, 2016.

*Primary Examiner* — William H Mayo, III
(74) *Attorney, Agent, or Firm* — McGinn IP Law Group, PLLC

(57) ABSTRACT

A power cable polymer joint includes a polymeric insulator tube including a cable insertion hole into which a stripped end portion of a power cable is inserted. The polymeric insulator tube includes an insulation including a polymer-based material, an embedded pipe including a metal and embedded on an inner peripheral surface of the insulation so as to face the end portion of the power cable, and a first semi-conductive portion including mainly a polymer-based material and covering an outer peripheral surface of the embedded pipe.

8 Claims, 3 Drawing Sheets

(56) References Cited

U.S. PATENT DOCUMENTS

2008/0029289 A1* 2/2008 Amerpohl ............ H02G 15/064
174/73.1

FOREIGN PATENT DOCUMENTS

| | | |
|---|---|---|
| JP | 2008-220009 A | 9/2008 |
| JP | 5060800 B2 | 10/2012 |
| WO | WO 2012/159681 A2 | 11/2012 |

* cited by examiner

POWER CABLE POLYMER JOINT

The present application is based on Japanese patent application No. 2014-251555 filed on Dec. 12, 2014, the entire contents of which are incorporated herein by reference.

BACKGROUND OF THE INVENTION

1. Field of the Invention

The present invention relates to a power cable polymer joint using a polymeric insulator tube.

2. Description of the Related Art

In porcelain insulator-type freestanding dry terminal joints, porcelain insulator is relatively heavy. Therefore, a freestanding dry terminal joint lighter than when using porcelain insulator has been proposed (see e.g., JP-B-5060800).

The freestanding dry terminal joint is provided with a flexible rubber insulation layer having cable insertion holes for insertion of an end side of a cable, and a freestanding resin tube which is integrally provided in the insulation layer in the middle of the thickness of the insulation layer so as to extend in an axial direction and has electrical insulating properties and rigidity.

SUMMARY OF THE INVENTION

The freestanding dry terminal joint is constructed by using the light rubber insulation layer and the resin tube as a core so as to reduce the weight of the terminal joint. In addition, it has free-standing properties required to keep a vertical upright position by using the resin tube as a core. Thus, it is easy to install on utility poles.

However, since the freestanding resin tube as the core is formed of the resin, the joint when used horizontally may not keep the horizontal position by itself and the tip portion thereof may hang down. Thus, the resin tube is not good enough as the core.

It is an object of the invention to provide a power cable polymer joint that is lightened as compared to using the porcelain insulator and has the free-standing properties required to keep the horizontal position even when used horizontally.

According to an embodiment of the invention, a power cable polymer joint comprises a polymeric insulator tube comprising a cable insertion hole into which a stripped end portion of a power cable is inserted, wherein the polymeric insulator tube comprises:

an insulation comprising a polymer-based material;

an embedded pipe comprising a metal and embedded on an inner peripheral surface of the insulation so as to face the end portion of the power cable; and a first semi-conductive portion comprising mainly a polymer-based material and covering an outer peripheral surface of the embedded pipe.

In the above embodiment, the power cable polymer joint may further comprise:

an embedded flange comprising a metal and embedded in the insulation on a side of the outer peripheral surface such that a mounting surface to be attached to another member is exposed from the insulation; and a second semi-conductive portion comprising mainly a polymer-based material and covering a surface of the embedded flange exposed from the insulation.

Effects of the Invention

According to an embodiment of the invention, a power cable polymer joint can be provided that is lightened as compared to using the porcelain insulator and has the free-standing properties required to keep the horizontal position even when used horizontally.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Figure 1:
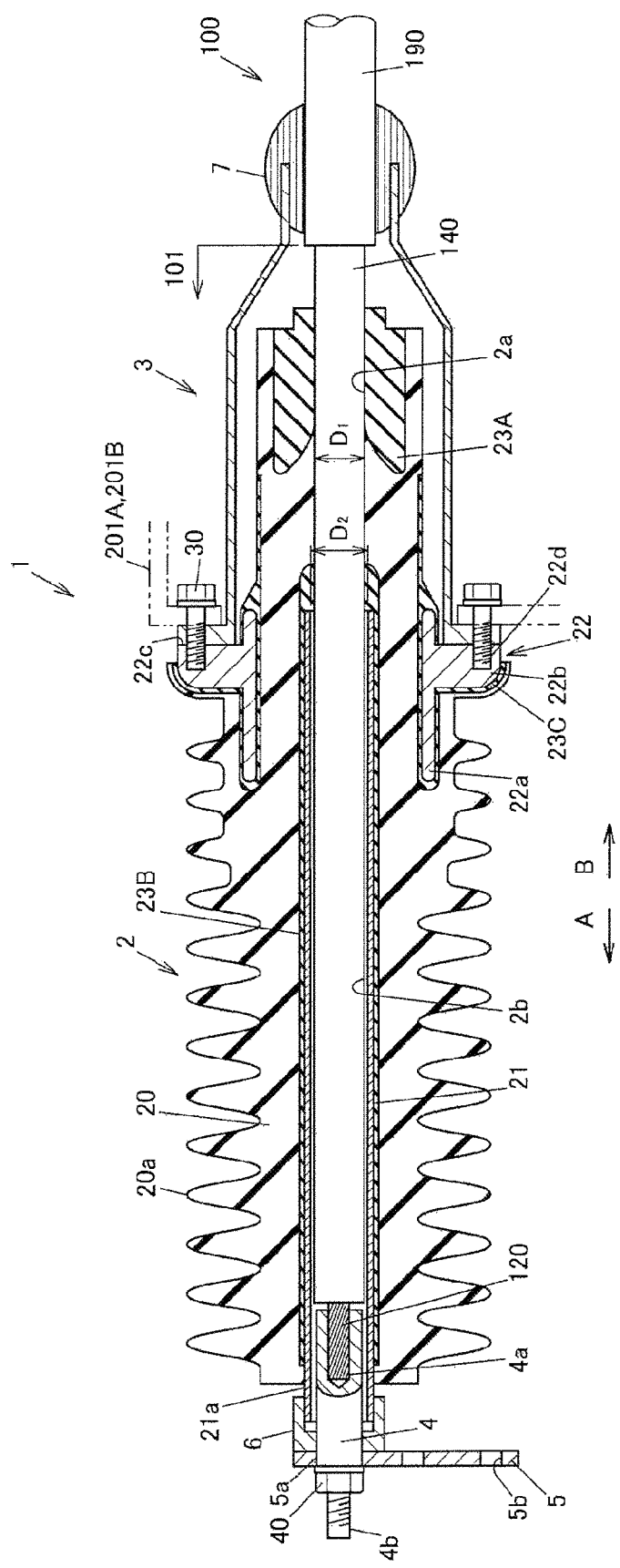
FIG. 1 is a longitudinal cross-sectional view showing a configuration example of a power cable polymer joint in a first embodiment of the present invention.

Embodiments of the invention will be described below in reference to the drawings. Constituent elements having substantially the same functions are denoted by the same reference numerals in each drawing and the overlapping explanation thereof will be omitted.

First Embodiment

Figure 2:
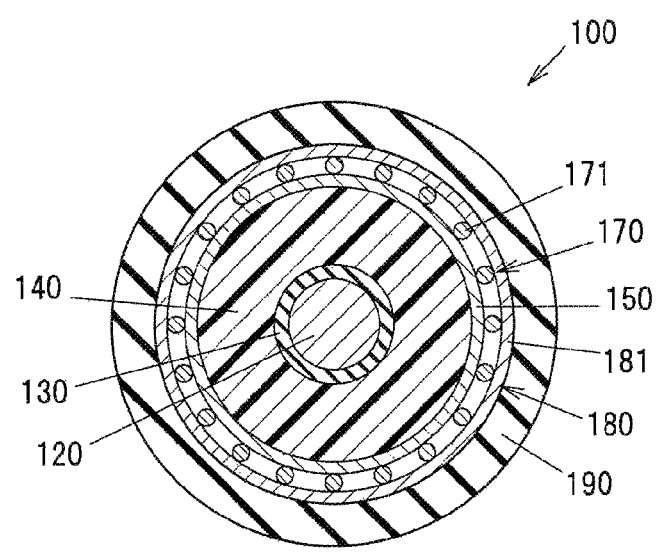
FIG. 2 is a lateral cross-sectional view showing a power cable shown in FIG. 1.

FIG. 1 is a longitudinal cross-sectional view showing a configuration example of a power cable polymer joint in the first embodiment of the invention. FIG. 2 is a lateral cross-sectional view showing a power cable shown in FIG. 1.

A power cable polymer joint 1 is formed mainly of a polymer-based material (an insulating polymer material), and is provided with a polymeric insulator tube 2 having cable insertion holes 2a and 2b for insertion of a stripped end portion 101 of a power cable 100, a protective metal fitting 3 for protecting a rear-end side B (opposite to an insertion direction A) of the polymeric insulator tube 2, a conductor-connecting rod 4 connected to a conductor 120 of the power cable 100, a fixing terminal 5 to which the conductor-connecting rod 4 is attached, a high-voltage shield 6 connected to the conductor-connecting rod 4 via the fixing terminal 5, and a waterproofing portion 7 for sealing between the protective metal fitting 3 and the power cable 100.

Configuration of Polymeric Insulator Tube

The polymeric insulator tube 2 is provided with a flexible insulation 20 formed of a polymer-based material, an embedded pipe 21 as a reinforcing member or a core formed of a metal and embedded on an inner peripheral surface of the insulation 20 so as to face an insulation layer 140 of the end portion 101 of the power cable 100, an embedded flange 22 as a reinforcing member or a core formed of a metal and embedded in the insulation 20 on the outer peripheral side, a first semi-conductive portion 23A for relaxing an electric field at the end portion 101 of the power cable 100, a second semi-conductive portion 23B for relaxing an electric field in the embedded pipe 21, and a third semi-conductive portion 23C for relaxing an electric field in the embedded flange 22. The insulation 20, the embedded pipe 21, the embedded flange 22 and the first to third semi-conductive portions 23A to 23C, which constitute the polymeric insulator tube 2, are integrally formed using a mold in a factory. The insulation 20 and the first to third semi-conductive portions 23A to 23C here are an example of insulation protective layer.

Plural umbrella portions 20a are formed on the outer periphery of the insulation 20 at certain intervals. The polymer-based material for forming the insulation 20 is, e.g., a silicone rubber, an ethylene-propylene rubber (EPM) or an ethylene-propylene-diene rubber (EPDM), etc.

The first cable insertion hole 2a of the insulation protective layer located on the side B opposite to the insertion direction A has a smaller inner diameter than an outer diameter $D_1$ of the end portion 101 of the power cable 100, i.e., of the insulation layer 140, before insertion of the end portion 101 of the power cable 100, and is tightly in contact with the insulation layer 140 once the insulation layer 140 of the power cable 100 is inserted.

The embedded pipe 21 is formed of, e.g., a metal such as brass or aluminum alloy. The embedded pipe 21 has, e.g., an outer diameter of 30 to 50 mm and a thickness of 2 to 5 mm. To facilitate insertion of the power cable 100, the embedded pipe 21 has the second cable insertion hole 2b having an inner diameter $D_2$ which is larger than the outer diameter of the insulation layer 140. Since the outer peripheral surface of the embedded pipe 21 is covered with the second semi-conductive portion 23B, it is possible to use a commercially available product as the embedded pipe 21. Alternatively, the second semi-conductive portion 23B can be omitted when the embedded pipe 21 is formed to have a smooth outer peripheral surface (e.g., with an arithmetic mean roughness Ra of not more than 6.3 μm).

The embedded pipe 21 also has a portion 21a where an end portion thereof in the insertion direction A is exposed from the insulation 20 in an axial direction of the cable. This exposed portion 21a is connected to the high-voltage shield 6 as a connection member, and the high-voltage shield 6 is connected to the conductor 120 of the power cable 100 via the fixing terminal 5 and the conductor-connecting rod 4. As a result, the embedded pipe 21 exerts a shielding effect. That is, in case of a structure in which the embedded pipe 21 is not provided on the inner peripheral surface of the insulation 20, a space between the inner peripheral surface and the insulation layer 140 of the power cable 100 needs to be filled with an insulating compound to prevent insulation breakdown. On the other hand, in the present embodiment, since the embedded pipe 21 is embedded on the inner peripheral surface of the insulation 20 and is connected to the conductor 120 of the power cable 100, a space between the embedded pipe 21 and the insulation layer 140 is a close space and there is no need to fill a compound between the embedded pipe 21 and the insulation layer 140.

The embedded flange 22 is provided with a cylinder portion 22a having a cylindrical shape and a flange portion 22b provided on the outer peripheral surface of the cylinder portion 22a all around the circumference. The embedded flange 22 is embedded in the insulation 20 on the outer peripheral side so that a mounting surface 22c to be attached to another member is exposed from the insulation 20. Female screws 22d are formed on the mounting surface 22c so that the embedded flange 22 can be attached to a case, etc., by bolts 30. The embedded flange 22 having such a configuration is formed of, e.g., a metal such as brass or aluminum alloy and is connected to a ground when in use.

The first to third semi-conductive portions 23A to 23C are formed mainly of a polymer-based material. In detail, the first to third semi-conductive portions 23A to 23C are formed by extruding a polymer-based material which is obtained by, e.g., dispersing conductive powder such as carbon in a silicone rubber, EMP or EPDM, etc., and thus has conductivity.

The first semi-conductive portion 23A, before insertion of the end portion 101 of the power cable 100, has a smaller inner diameter than the outer diameter $D_1$ of the insulation layer 140. The second semi-conductive portion 23B covers the outer peripheral surface of the embedded pipe 21 except the end portion thereof in the insertion direction A side. The third semi-conductive portion 23C covers a surface of the embedded flange 22 which is not exposed from the insulation 20.

Other Configuration

The protective metal fitting 3 is formed of, e.g., a metal such as brass or aluminum alloy and is configured to allow the power cable polymer joint 1 to be attached to a case 201A or 201B (described later) by the bolts 30.

The conductor-connecting rod 4 has a connection hole 4a formed on the rear-end side and a male screw 4b formed on the front-end side. After inserting the conductor 120 of the power cable 100 into the connection hole 4a of the conductor-connecting rod 4, the diameter of the connection hole 4a is reduced by crimping the rear-end side of the conductor-connecting rod 4 and the conductor-connecting rod 4 is thereby connected to the conductor 120 of the power cable 100.

The fixing terminal 5 has an insertion hole 5a for inserting the conductor-connecting rod 4 and a connection hole 5b to which an electric wire is connected. The conductor-connecting rod 4 is inserted into the insertion hole 5a, the male screw 4b is tightened with a nut 40, and the fixing terminal 5 is thereby attached to the conductor-connecting rod 4.

The high-voltage shield 6 is formed of a metal and has a cylindrical shape surrounding the conductor-connecting rod 4. The high-voltage shield 6 connects the embedded pipe 21 to the fixing terminal 5 and the conductor-connecting rod 4 is thereby shielded.

The waterproofing portion 7 is formed by winding a highly waterproof member, e.g., a polyethylene tape or epoxy tape, etc., having an adhesive layer.

Configuration of Power Cable

The power cable 100 is composed of the conductor 120 formed of a twisted wire, an inner semi-conductive layer 130 formed around the conductor 120, the insulation layer 140 formed around the inner semi-conductive layer 130, an outer semi-conductive layer 150 formed around the insulation layer 140, a shield layer 170 formed by winding wires 171 around the outer semi-conductive layer 150, a binding tape layer 180 formed by winding a binding tape 181 around the shield layer 170, and a sheath layer 190 formed around the binding tape layer 180.

The conductor 120 is formed by twisting plural strands together. As the strand, it is possible to use a wire rod, e.g., a tin-plated soft copper wire, etc. The conductor 120 transmits electricity with a high voltage of, e.g., not less than 7000V.

The inner semi-conductive layer 130 and the outer semi-conductive layer 150 are provided to relax electric field concentration, are formed mainly of a polymer-based material, and are formed by extruding a material which is obtained by, e.g., dispersing conductive powder such as carbon in a rubber such as ethylene-propylene rubber, ethylene-vinyl acetate copolymer (EVA) resin or butyl rubber and thus has conductivity.

The insulation layer 140 is formed by extruding a material such as ethylene-propylene rubber, vinyl chloride, cross-linked polyethylene, silicone rubber or fluorine-based material, etc.

The shield layer 170 is formed by spirally winding the wires 171 around the outer semi-conductive layer 150 along the axial direction of the cable. The shield layer 170 is connected to a ground when in use.

The binding tape layer 180 is formed by spirally winding the binding tape 181, with an overlap, around the shield layer 170 along the axial direction of the cable. The binding tape 181 used can be, e.g., a plastic or rayon tape having a thickness of 0.03 to 0.5 mm and a width of 50 to 90 mm.

The sheath layer 190 is formed by extruding a material formed by adding a cross-linking agent, etc., to a rubber such as natural rubber, butyl rubber, halogenated butyl rubber, ethylene-propylene rubber, chloroprene rubber, styrene-butadiene rubber, nitrile rubber, chlorosulfonated polyethylene, chlorinated polyethylene, epichlorohydrin rubber, acrylic rubber, silicone rubber, fluoro-rubber, urethane rubber or halogen-free polyolefin elastomer.

Functions and Effects of the First Embodiment

In the first embodiment, the following functions and effects are obtained.

(1) Since a polymer-based material, which is lighter than porcelain, is used as the insulation and also the thin embedded pipe 21 is used as a reinforcing member, the power cable polymer joint 1 of the invention is lighter than when using a porcelain insulator.

(2) The embedded pipe 21 formed of a metal is embedded on the inner peripheral surface of the insulation 20. Therefore, even when used horizontally, the power cable polymer joint 1 of the invention exerts free-standing properties and can maintain the horizontal position.

(3) In addition to the embedded pipe 21, the embedded flange 22 formed of a metal is also embedded in the insulation 20 on the outer peripheral side. Therefore, even when used horizontally, the power cable polymer joint 1 of the invention exerts free-standing properties and can maintain the horizontal position.

(4) The outer peripheral surface of the embedded pipe 21 is covered with the second semi-conductive portion 23B. Therefore, even if the embedded pipe 21 has a flaw on the outer peripheral surface, electric field concentration due to the flaw can be relaxed.

(5) The surface of the embedded flange 22, except a portion exposed from the insulation 20, is covered with the third semi-conductive portion 23C. Therefore, even if the embedded flange 22 has a flaw on the surface, electric field concentration due to the flaw can be relaxed.

(6) Since the embedded pipe 21 is connected to the conductor 120 of the power cable 100, a space between the embedded pipe 21 and the insulation layer 140 is a close space and there is no need to fill a compound between the embedded pipe 21 and the insulation layer 140.

Second Embodiment

Figure 3:
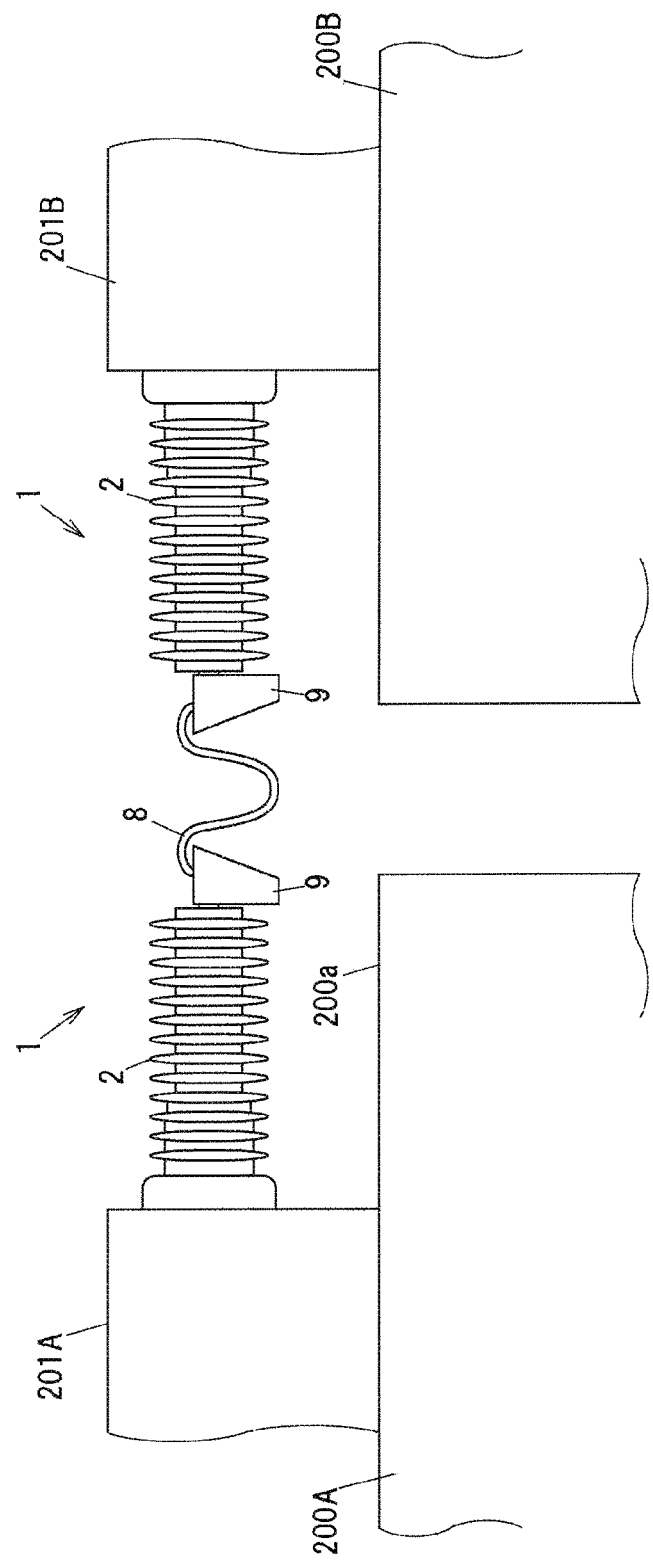
FIG. 3 is a front view showing a main portion of a configuration example of vehicle-to-vehicle connection in a second embodiment of the invention.

FIG. 3 is a front view showing a main portion of an example of vehicle-to-vehicle connection in the second embodiment of the invention. This vehicle-to-vehicle connection, to which the power cable polymer joint in the first embodiment is applied, includes a power cable polymer joint 1A attached to the case 201A provided on a roof of a railway vehicle 200A on one side, a power cable polymer joint 1B attached to the case 201B provided on a roof of a railway vehicle 200B on the other side, a flexible electric wire 8 for connecting the two power cable polymer joints 1A and 1B, and insulation covers 9 covering the conductor-connecting portions 4, the fixing terminals 5 and the high-voltage shields 6 of the power cable polymer joints 1A and 1B.

To attach the power cable polymer joints 1A and 1B to the cases 201A and 201B, the bolts 30 are screwed into the female screws 22d of the embedded flange 22 and tightened with the protective metal fitting 3 in-between, as shown in FIG. 1.

The power cable polymer joints 1A and 1B are connected to each other by attaching a conductor of the electric wire 8 to the respective fixing terminals 5.

Functions and Effects of the Second Embodiment

In the second embodiment, the following functions and effects are obtained.

(1) In the power cable polymer joints 1A and 1B, the embedded pipe 21 formed of a metal is embedded on the inner peripheral surface of the insulation 20 and also the embedded flange 22 formed of a metal is embedded in the insulation 20 on the outer peripheral side. Therefore, the power cable polymer joints 1A and 1B hardly hang down on the tip side even when positioned horizontally and this allows the power cable polymer joints 1A and 1B to be used in a horizontal position.

(2) The power cable polymer joints 1A and 1B are connected to each other by the flexible electric wire 8. Therefore, even when the railway vehicles 200A and 200B turn a curve, it is possible to follow the curve.

The present invention is not intended to be limited to the above-mentioned embodiments, and the various kinds of embodiments can be implemented. For example, although the cable terminal joint has been described in each embodiment, the invention is also applicable to a cable intermediate joint.

In addition, although horizontal use has been described in the second embodiment, the invention is also applicable to vertical use.

In addition, some of the constituent elements in the above-mentioned embodiments can be omitted or changed without changing the gist of the invention. For example, in the above-mentioned embodiments, the second semi-conductive portion 23B may be omitted when forming the embedded pipe 21 to have a smooth or mirror outer peripheral surface. Also, in the above-mentioned embodiments, the third semi-conductive portion 23C may be omitted when forming the embedded flange 22 to have a smooth or mirror surface.

What is claimed is:

1. A power cable polymer joint, comprising a polymeric insulator tube comprising a cable insertion hole into which a stripped end portion of a power cable is inserted,
   wherein the polymeric insulator tube comprises:
       an insulation comprising a polymer-based material;
       an embedded pipe comprising a metal and embedded on an inner peripheral surface of the insulation so as to face the end portion of the power cable; and
       a first semi-conductive portion comprising mainly a polymer-based material and covering an outer peripheral surface of the embedded pipe,
   wherein the power cable polymer joint is provided on a roof of a railway vehicle, and
   wherein the power cable polymer joint is used non-vertically.

2. The power cable polymer joint according to claim 1, further comprising:
   an embedded flange comprising a metal and embedded in the insulation on a side of the outer peripheral surface such that a mounting surface to be attached to another member is exposed from the insulation; and a second semi-conductive portion comprising mainly a polymer-based material and covering a surface of the embedded flange exposed from the insulation.

3. The power cable polymer joint of claim 1, wherein the power cable polymer joint is used horizontally and the embedded pipe has a thickness of 2 to 5 mm.

4. The power cable polymer joint of claim 1, wherein the embedded pipe includes a portion exposed from the insulation in an axial direction of the cable, and
wherein the exposed portion is connected to a conductor of the power cable via a connection member.

5. The power cable polymer joint of claim 1, wherein:
the polymeric insulator tube comprises an insulation protective layer comprising a first insertion hole having a smaller inner diameter than an outer diameter of the end portion of the power cable before an insertion of the end portion of the power cable and is tightly in contact with the end portion of the power cable when inserted;
the embedded pipe is formed of a metal and includes a second cable insertion hole having an inner diameter which is larger than the outer diameter of the outer diameter of the end portion of the power cable; and
the embedded pipe is embedded on an inner peripheral surface of the insulation protective layer closer to the end portion of the power cable in relation to the first cable insertion hole so as to face the end portion of the power cable.

6. The power cable polymer joint of claim 1, wherein an arithmetic mean roughness Ra of the outer peripheral surface of the embedded pipe is not more than 6.3 µm.

7. The power cable polymer joint of claim 1, wherein the power cable is inserted into the embedded pipe as a conductor comprising a twisted wire, as covered by an inner semi-conductive layer, which is covered by an insulation layer, the power cable having been stripped prior to insertion into the embedded pipe of:
an outer semi-conductor layer formed around the insulation layer;
a shield layer comprising winding wires formed around the semi-conductor layer;
a binding tape layer formed around the shield layer; and
a sheath layer formed around the binding tape layer.

8. A railway vehicle comprising the power cable polymer joint of claim 1.

* * * * *